US009810124B2

(12) United States Patent
Ueda

(10) Patent No.: US 9,810,124 B2
(45) Date of Patent: Nov. 7, 2017

(54) EXHAUST GAS PURIFICATION SYSTEM OF INTERNAL COMBUSTION ENGINE

(71) Applicant: Hiroyoshi Ueda, Susono (JP)

(72) Inventor: Hiroyoshi Ueda, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 136 days.

(21) Appl. No.: 14/781,722

(22) PCT Filed: Apr. 5, 2013

(86) PCT No.: PCT/JP2013/060512
§ 371 (c)(1),
(2) Date: Oct. 1, 2015

(87) PCT Pub. No.: WO2014/162597
PCT Pub. Date: Oct. 9, 2014

(65) Prior Publication Data
US 2017/0089242 A1  Mar. 30, 2017

(51) Int. Cl.
*F01N 3/20* (2006.01)
*F01N 9/00* (2006.01)
(Continued)

(52) U.S. Cl.
CPC ......... *F01N 3/208* (2013.01); *B01D 53/9431* (2013.01); *B01D 53/9495* (2013.01);
(Continued)

(58) Field of Classification Search
None
See application file for complete search history.

(56) References Cited

U.S. PATENT DOCUMENTS

2005/0031514 A1   2/2005  Patchett et al.
2007/0137184 A1   6/2007  Patchett et al.
(Continued)

FOREIGN PATENT DOCUMENTS

| CN | 101600864 A | 12/2009 |
| JP | 2007-501353 | 1/2007 |
| JP | 2009-041437 | 2/2009 |

*Primary Examiner* — Walter D Griffin
*Assistant Examiner* — Jelitza Perez
(74) *Attorney, Agent, or Firm* — Finnegan, Henderson, Farabow, Garrett & Dunner, LLP

(57) ABSTRACT

In an exhaust gas purification system having an oxidation catalyst and an exhaust gas purifying unit formed so as to include a filter and a selective reduction-type NOx catalyst, at least one of supply of the fuel component and supply of ammonia or an ammonia precursor in an amount that is increased when a prescribed condition under which a part of a fuel component supplied to exhaust gas passes through to a downstream side of the oxidation catalyst is satisfied as compared to a non-passing time supply amount that is a supply amount of ammonia or the ammonia precursor to be supplied when the prescribed condition is not satisfied is controlled such that ammonia for NOx selective reduction by the increased ammonia or ammonia precursor reaches the exhaust gas purifying unit before the passed fuel component. Accordingly, an effect of a fuel component supplied to exhaust gas on a NOx purification performance of the selective reduction-type NOx catalyst is minimized in the exhaust gas purification system of the internal combustion engine which includes the filter and the selective reduction-type NOx catalyst.

6 Claims, 6 Drawing Sheets

(51) Int. Cl.
*B01D 53/94* (2006.01)
*F01N 3/10* (2006.01)
*F01N 3/035* (2006.01)
*F01N 3/025* (2006.01)
*F01N 13/00* (2010.01)
*F01N 11/00* (2006.01)

(52) U.S. Cl.
CPC ........... *F01N 3/0253* (2013.01); *F01N 3/035* (2013.01); *F01N 3/103* (2013.01); *F01N 9/00* (2013.01); *F01N 11/002* (2013.01); *F01N 13/009* (2014.06); *F01N 2550/02* (2013.01); *F01N 2550/04* (2013.01); *F01N 2610/02* (2013.01); *F01N 2610/03* (2013.01); *F01N 2900/1618* (2013.01)

(56) References Cited

U.S. PATENT DOCUMENTS

| | | |
|---|---|---|
| 2008/0132405 A1 | 6/2008 | Patchett et al. |
| 2009/0255241 A1 | 10/2009 | Patchett et al. |
| 2010/0058741 A1 | 3/2010 | Toshioka et al. |
| 2010/0319324 A1* | 12/2010 | Mital .................. F01N 3/021 60/286 |
| 2012/0034133 A1 | 2/2012 | Patchett et al. |
| 2014/0349841 A1 | 11/2014 | Patchett et al. |
| 2015/0011377 A1 | 1/2015 | Patchett et al. |
| 2015/0126358 A1 | 5/2015 | Patchett et al. |
| 2015/0151250 A1 | 6/2015 | Patchett et al. |
| 2015/0159533 A1 | 6/2015 | Patchett et al. |
| 2015/0165426 A1 | 6/2015 | Patchett et al. |
| 2015/0190798 A1 | 7/2015 | Patchett et al. |

* cited by examiner

EXHAUST GAS PURIFICATION SYSTEM OF INTERNAL COMBUSTION ENGINE

CROSS-REFERENCE TO RELATED APPLICATIONS

This application is a national phase application of International Application No. PCT/JP2013/060512, filed Apr. 5, 2013, the content of which is incorporated herein by reference.

TECHNICAL FIELD

The present invention relates to an exhaust gas purification system of an internal combustion engine.

BACKGROUND ART

Conventionally, as an exhaust gas purification apparatus provided in an exhaust passage of an internal combustion engine, an exhaust gas purification apparatus is developed in which a filter carries a selective reduction-type type NOx catalyst (hereinafter, sometimes also referred to as an "SCR catalyst") which selectively reduces NOx in exhaust gas (for example, refer to Patent Document 1). The filter collects particulate matter (hereinafter, referred to as "PM") in the exhaust gas. The SCR catalyst reduces the NOx in the exhaust gas using ammonia ($NH_3$) as a reducing agent. Hereinafter, such a filter carrying an SCR catalyst as described above will be referred to as an "SCRF". In the exhaust gas purification apparatus described in Patent Document 1, an oxidation catalyst and a urea adding valve for NOx purification are arranged on an upstream side of the SCRF. In this manner, by adopting an SCRF as an exhaust gas purification apparatus, an SCR catalyst can be arranged further upstream in an exhaust passage. As a result, the SCR catalyst is more readily heated by heat, of the exhaust gas, whereby a warm-up performance of the SCR catalyst and a NOx purification rate of the SCR catalyst can be improved.

In addition, a supply valve for supplying a reducing agent for reducing and purifying NOx is also arranged in a configuration in which a filter and an SCR catalyst are individually arranged in an exhaust passage of an internal combustion engine. In both an SCRF and a configuration in which a filter and an SCR catalyst are individually arranged, NOx purification due to a reducing action of ammonia is exhibited as a result of ammonia being adsorbed at a prescribed site of the SCR catalyst. However, in an internal combustion engine, there may be cases where a fuel component is supplied into exhaust gas for the purpose of raising the temperature of the exhaust gas or the like. If the fuel component is adsorbed at the prescribed site of the SCR catalyst while being supplied into exhaust gas, NOx purification by the SCR catalyst can no longer be performed with the same effectiveness. In consideration thereof, a technique is disclosed for removing an adsorbed fuel component by forcibly raising the temperature of an SCR catalyst when the fuel component adsorbed by the SCR catalyst reaches or exceeds a prescribed amount (for example, refer to Patent Document 2).

PRIOR ART REFERENCES

Patent Literatures

Patent Document 1: Japanese Translation of PCT Application No. 2007-501353

Patent Document 2: Japanese Patent Application Laid-open No. 2009-41437

SUMMARY OF THE INVENTION

Problems to be Solved by the Invention

In an exhaust gas purification system of an internal combustion engine, when a filter for collecting PM in exhaust gas and a selective reduction-type NOx catalyst that selectively reduces NOx in the exhaust gas are provided, a fuel component for increasing temperature of the exhaust gas flowing into the filter or the selective reduction-type NOx catalyst and ammonia or an ammonia precursor (hereinafter, referred to "ammonia or the like") for NOx purification are supplied. Generally, the fuel component supplied to exhaust gas is oxidized by an oxidation catalyst arranged on an upstream side of the filter to increase the temperature of the exhaust gas and, as a result, a prescribed objective such as oxidation and removal of PM collected by a filter on a downstream side or maintaining the temperature of the selective reduction-type NOx catalyst is achieved. On the other hand, ammonia or the like supplied to the exhaust gas is adsorbed at a prescribed site in the selective reduction-type NOx catalyst in the form of ammonia and, as a result, reduction and purification of NOx is performed.

In this case, when the fuel component supplied to the exhaust gas passes through to a downstream side of the oxidation catalyst without being oxidized by the oxidation catalyst, the fuel component may reach the selective reduction-type NOx catalyst arranged on the downstream side of the oxidation catalyst and may end up being adsorbed at the prescribed site which is originally intended to adsorb ammonia. In this case, since adsorption of ammonia by the selective reduction-type NOx catalyst is inhibited, the NOx purification rate of the selective reduction-type NOx catalyst may decline if this situation continues. In the present specification, a situation where the fuel component passes through to a downstream side of the oxidation catalyst without being oxidized by the oxidation catalyst may be referred to as a "passing of the fuel component" and the fuel component having passed through may be simply referred to as a "passed fuel component".

The present invention has been made in consideration of the problem described above and an object thereof is to minimize an effect of a fuel component supplied to exhaust gas on a NOx purification performance of a selective reduction-type NOx catalyst in an exhaust gas purification system of an internal combustion engine which includes a filter and a selective reduction-type NOx catalyst.

Means for Solving the Problems

In the present invention, in order to solve the problem described above, attention was paid in an exhaust gas purification system of an internal combustion engine which is provided with an exhaust gas purification unit including a selective reduction-type NOx catalyst and a filter to a correlation between ammonia for selective reduction of NOx reaching the exhaust gas purification unit and a fuel component reaching the exhaust gas purification unit. In other words, the present inventors discovered that, by controlling an adsorption timing and an adsorption amount of ammonia by the selective reduction-type NOx catalyst included in the exhaust gas purifying unit, an effect of a passed fuel component on a NOx purification performance of the selective reduction-type NOx catalyst can be reduced.

Specifically, the present invention provides an exhaust gas purification system of an internal combustion engine including: an oxidation catalyst which is provided in an exhaust passage of the internal combustion engine and which has an oxidizing function; a fuel supplying unit which supplies a fuel component to the oxidation catalyst via exhaust gas flowing into the oxidation catalyst; an exhaust gas purifying unit which is provided in the exhaust passage on a downstream side of the oxidation catalyst and is formed so as to include a filter which collects particulate matter in the exhaust gas, and a selective reduction-type NOx catalyst which selectively reduces NOx in the exhaust gas using ammonia as a reducing agent; a reducing agent supplying unit which supplies ammonia or an ammonia precursor to the exhaust gas purifying unit via exhaust gas flowing into the exhaust gas purifying unit; and a supply control unit which controls at least one of supply of the fuel component to be supplied by the fuel supplying unit and supply of ammonia or the ammonia precursor in an amount that is increased when a prescribed condition under which a part of the fuel component supplied by the fuel supplying unit passes through to the downstream side of the oxidation catalyst is satisfied as compared to a non-passing time supply amount that is a supply amount of ammonia or the ammonia precursor to be supplied by the reducing agent supplying unit when the prescribed condition is not satisfied, the control being performed such that ammonia for NOx selective reduction by the increased ammonia or ammonia precursor reaches the exhaust gas purifying unit before the fuel component.

With the exhaust gas purification system according to the present invention, by including the exhaust gas purification unit, purification of NOx in exhaust gas is performed by the selective reduction-type NOx catalyst and collection of PM in the exhaust gas is performed by the filter. With respect to the former, a selective reduction reaction with NOx is performed by ammonia or a precursor thereof (hereinafter, referred to as "ammonia or the like") as a reducing agent that is supplied to the exhaust gas by the reducing agent supplying unit as ammonia is ultimately adsorbed by the selective reduction-type NOx catalyst. On the other hand, with respect to the latter, PM in the exhaust gas is collected by the filter and is prevented from being discharged to the outside. In addition, in the exhaust gas purification system, a fuel component is supplied by the fuel supplying unit in accordance with an objective such as increasing exhaust gas temperature to oxidize and remove the PM collected by the filter. The fuel component supplied in this manner increases exhaust gas temperature by being oxidized by an oxidation catalyst.

Depending on conditions under which the exhaust gas purification system is placed, there may be cases where a part of the supplied fuel component is not oxidized by the oxidation catalyst. The fuel component that is not oxidized may possibly be carried by a flow of exhaust gas as a passed fuel component and may reach the exhaust gas purifying unit positioned on a downstream side or the oxidation catalyst. The fuel component having reached the exhaust gas purifying unit generally causes an adsorption effect by the selective reduction-type NOx catalyst that is stronger than an adsorption effect of ammonia for NOx reduction. Therefore, the passed fuel component ends up being preferentially adsorbed by the selective reduction-type NOx catalyst over ammonia and, as a result, tends to act so as to inhibit reduction and purification, of NOx by ammonia. In other words, when the fuel component supplied by the fuel supplying unit passes through the oxidation catalyst, the fuel component may cause a decline in the NOx purification rate by the selective reduction-type NOx catalyst.

Passing of a fuel component through an oxidation catalyst occurs due to various factors including an exhaust flow rate related to an operating state of an internal combustion engine, an amount of the fuel component supplied to exhaust gas, and a temperature of the oxidation catalyst related to an oxidation reaction of the oxidation catalyst. Therefore, with the exhaust gas purification system of an internal combustion engine according to the present invention, in consideration of adsorption of the fuel component at a prescribed site of a selective reduction-type NOx catalyst at which ammonia is to be favorably adsorbed when the fuel component having passed through the oxidation catalyst reaches the exhaust gas purifying unit, at least one of supply of ammonia or the like or supply of the fuel component is controlled by the supply control unit such that ammonia for NOx purification reaches the exhaust gas purifying unit before the passed fuel component.

More specifically, the supply of ammonia or the like or the fuel component is controlled by the supply control unit when a prescribed condition, under which passing of the fuel component occurs is satisfied or, in other words, when it may be determined that the fuel component is to pass through the oxidation catalyst if the fuel component is supplied by the fuel supplying unit. In this case, an amount of ammonia or the like supplied by the reducing agent supplying unit is increased as compared to a supply amount of ammonia or the like when the prescribed, condition is not satisfied or, in other words, when it may be determined that, even if the fuel component is supplied by the fuel supplying unit, the fuel component is to be used for an oxidation reaction of the oxidation catalyst and should not pass through to a downstream side of the oxidation catalyst. In addition, control is executed by the supply control unit so that the ammonia reaching the selective reduction-type NOx catalyst due to the ammonia or the like in the increased amount reaches the exhaust gas purifying unit before the fuel component, supplied by the fuel supplying unit. In other words, a control object of the supply control unit may be one of or both the supply by the reducing agent supplying unit and the supply by the fuel supplying unit.

When control by the supply control unit is performed in this manner, if it can be determined that passing of the fuel component may occur, ammonia for NOx reduction is preferentially adsorbed, by the selective reduction-type NOx catalyst since the ammonia for NOx purification reaches the exhaust gas purifying unit before the passed fuel component. Accordingly, the adsorption-inhibiting effect by the passed fuel component can be minimized. Furthermore, since an increased amount of ammonia or the like is supplied when the prescribed condition is satisfied as compared to when the prescribed condition is not satisfied, an amount of ammonia adsorbed by the selective reduction-type NOx catalyst when the prescribed condition is satisfied can be increased and, subsequently, an effect of inhibiting ammonia adsorption due to adsorption of the fuel component belatedly reaching the exhaust gas purifying unit can be minimized. Accordingly, a significant decline in the amount of ammonia that is adsorbed by the selective redaction-type NOx catalyst in equilibrium can be avoided. This conceivably suppresses the effect of the passed fuel component and contributes to maintaining the NOx purification rate by the selective reduction-type NOx catalyst.

In the exhaust gas purification system of an internal combustion engine described above, the exhaust gas purifying unit may be a NOx purification filter formed by the filter carrying the selective reduction-type NOx catalyst. In this case, the exhaust gas purifying unit that is a NOx purification filter is to be formed as a so-called SCRF. With such a NOx purification filter, since the filter and the selective reduction-type NOx catalyst are arranged at locations that are substantially and spatially the same, a state is created where the passed fuel component and ammonia for NOx purification may coexist at the NOx purification filter. As a result, due to adsorption of the fuel component by the selective reduction-type NOx catalyst at the NOx purification filter, a decline in the NOx purification rate of the NOx purification filter is likely to occur. In consideration thereof, by controlling supply of the fuel component and the ammonia or the like by the supply control unit as described above, the NOx purification rate of the NOx purification filter can be effectively maintained. Moreover, a mode of the exhaust gas purifying unit according to the present invention is not limited to the mode of an SCRF and, for example, a mode can also be adopted in which the filter and the selective reduction-type NOx catalyst are individually arranged such that the filter is arranged on an upstream side of the selective reduction-type NOx catalyst.

In addition, in the exhaust gas purification system of an internal combustion engine heretofore described, the supply control unit may control at least one of a supply timing by the reducing agent supplying unit and a supply timing by the fuel supplying unit based on a time required by the fuel component supplied by the fuel supplying unit to reach the exhaust gas purifying unit, and a time required by ammonia for NOx selective reduction by ammonia or the ammonia precursor supplied by the reducing agent supplying unit to reach the exhaust gas purifying unit. In other words, as described above, given that the present invention considers it important that ammonia for NOx purification reaches the selective reduction-type NOx catalyst before the passed fuel component, a supply timing by the reducing agent supplying unit and/or a supply riming by the fuel supplying unit are controlled in consideration of the times respectively required by the ammonia and the fuel component to reach the exhaust gas purifying unit after being supplied. Moreover, the times respectively required by the ammonia and the fuel component to reach the exhaust gas purifying unit can be calculated based on capacities, exhaust amounts per unit time, and the like of exhaust passages from the respective supplying units to the exhaust gas purifying unit.

When control by the supply control unit is performed based on reaching times of the fuel component and ammonia to the exhaust gas purifying unit as described above, the following two modes can be exemplified with respect to the control by the supply control unit. Firstly, in the exhaust gas purification system of an internal combustion engine described above, supply of ammonia or the ammonia precursor by the reducing agent supplying unit may be performed periodically according to an operating state of the internal combustion engine. In addition, in this case, the supply control unit may be configured to control at least one of the supply timing by the reducing agent supplying unit and the supply timing by the fuel supplying unit so that the fuel component supplied by the fuel supplying unit reaches the exhaust gas purifying unit at a prescribed timing between a first reaching timing at which ammonia for NOx selective reduction by the increased ammonia or ammonia precursor that is supplied by the reducing agent supplying unit at one supply timing reaches the exhaust gas purifying unit, and a second reaching timing at which ammonia for NOx selective reduction by ammonia or the ammonia precursor that is supplied by the reducing agent supplying unit reaches the exhaust gats purifying unit next after the first reaching timing.

In the exhaust gas purification system of an internal combustion engine configured as described above, the supply of ammonia or the like by the fuel supplying unit is periodically performed in accordance with an amount of NOx contained in exhaust gas discharged from the internal combustion engine from moment to moment. Therefore, at the selective reduction-type NOx catalyst in the exhaust gas purifying unit, ammonia is periodically adsorbed and also consumed for NOx reduction depending on a supply period of ammonia. In addition, in the invention described above, the fuel component is to reach the selective reduction-type NOx catalyst at a prescribed timing after a first reaching timing at which ammonia for NOx selective reduction by the increased ammonia or the like reaches the selective reduction-type NOx catalyst and before a second reaching timing at which ammonia next reaches the selective reduction type NOx catalyst. At the prescribed timing, since ammonia for NOx selective reduction by the increased ammonia or the like has already been adsorbed by the selective reduction-type NOx catalyst, an amount of the fuel component that is adsorbed by the selective reduction-type NOx catalyst can be kept small and, as a result, the effect by the passed fuel component can be minimized.

As another mode of control by the supply control unit, according to an operating state of the internal combustion engine, supply of ammonia or an ammonia precursor by the reducing agent supplying unit may be performed periodically and supply of the fuel component by the fuel supplying unit may be performed a plurality of times. In addition, in this case, the supply control unit may be configured to control at least one of the supply timing by the reducing agent supplying unit and the supply timing by the fuel supplying unit so that, in a period during which supply by the reducing agent supplying unit and supply by the fuel supplying unit are performed in an overlapping manner, the increased amount of ammonia or ammonia precursor is supplied by the reducing agent supplying unit, and ammonia for NOx selective reduction by ammonia or the ammonia precursor that is supplied by the reducing agent supplying unit and the fuel component supplied by the fuel supplying unit alternately reach the exhaust gas purifying unit.

In the exhaust, gas purification system of an internal combustion engine configured as described above, the supply of ammonia or the like is periodically performed in a similar manner to the first mode and, at the same time, supply of the fuel component is performed a plurality of times. In addition, when both supplies are performed at the same timing, a state is created where the fuel component and ammonia for NOx purification may coexist at the selective reduction-type NOx catalyst. In consideration thereof, in a period in which both supplies overlap each other, control by the supply control unit is performed so that the increased amount of the ammonia or the like is supplied and ammonia for NOx selective reduction and the fuel component alternately reach the exhaust gas purifying unit. Accordingly, the effect by the passed fuel component can be minimized.

The exhaust gas purification system of an internal combustion engine heretofore described may be configured to further include a passed amount calculating unit that calculates a passed amount in which the fuel component supplied by the fuel supplying unit passes through to the downstream side of the oxidation catalyst when the prescribed condition is satisfied, based on at least any of an operating state of the internal combustion engine and a temperature of the oxidation catalyst. In addition, the supply control unit determines an increased supply amount of ammonia or the ammonia precursor with respect to the non-passing time supply amount, based on the passed amount of the fuel component calculated by the passed amount calculating unit. Due to such a configuration, a supply amount of ammonia or the like that is increased in order to suppress the effect by the passed fuel component can be set to a more preferable amount. As a result, wasting of ammonia or the like can be suppressed and the effect by the passed fuel component can be effectively reduced.

Effect of the Invention

According to the present invention, an effect of a fuel component supplied to exhaust gas on a NOx purification performance of a selective reduction-type NOx catalyst can be minimized in an exhaust gas purification system of an internal combustion engine which includes a filter and a selective reduction-type NOx catalyst.

MODES FOR CARRYING OUT THE INVENTION

Figure 1:
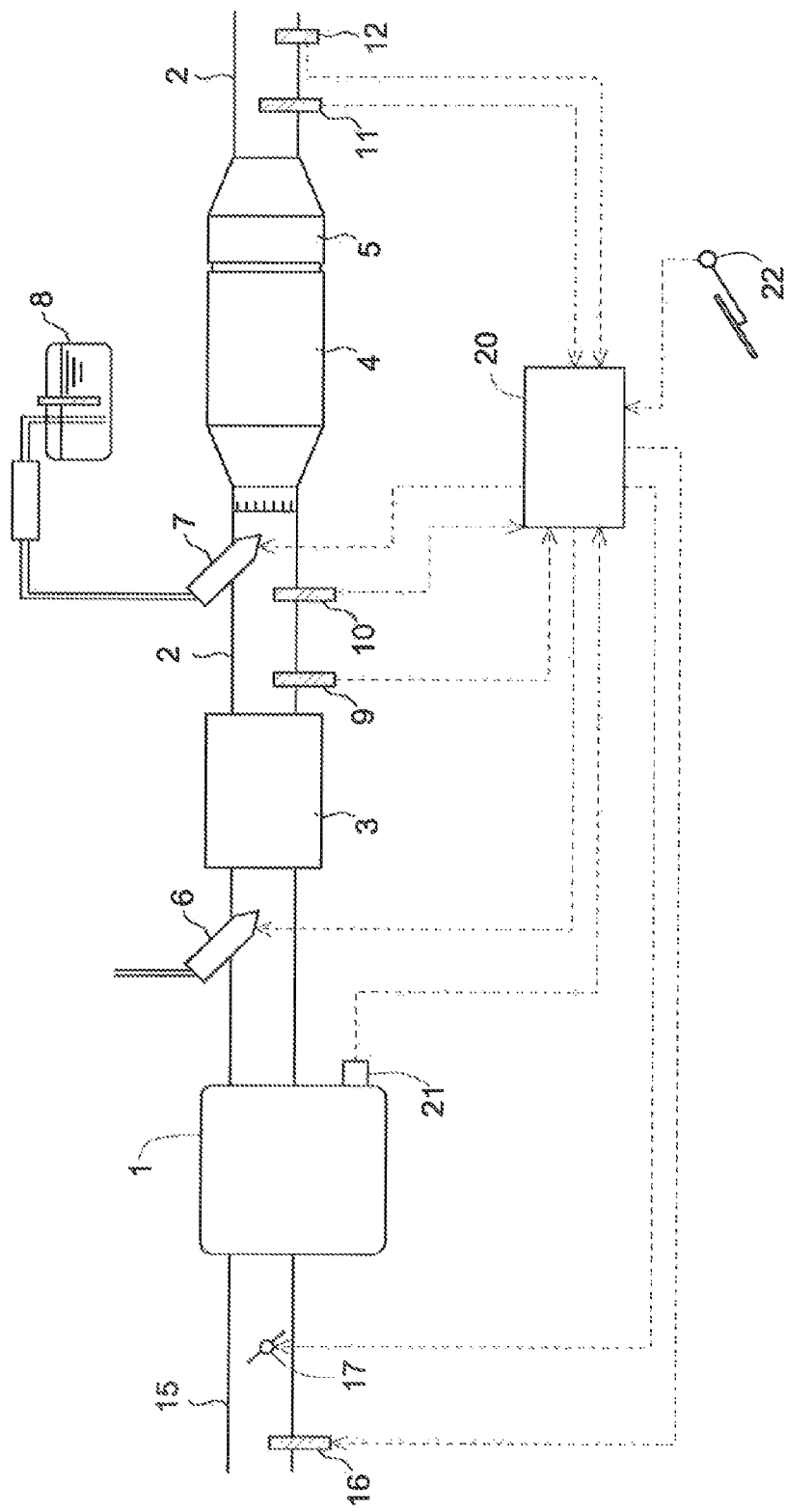
FIG. 1 is a diagram showing a schematic configuration of an exhaust gas purification system of an internal combustion engine according to the present invention.

Hereinafter, specific embodiments of the present invention will be described with reference to the drawings. It is to be understood that dimensions, materials, shapes, relative arrangements, and the like of components described in the embodiments are not intended to limit the technical scope of the invention thereto unless otherwise noted.
[First embodiment]
An embodiment of an exhaust gas purification system of an internal combustion engine according to the present invention will be described with reference to the drawings attached to the present specification. FIG. 1 is a diagram which shows a schematic configuration of an exhaust gas purification system of an internal combustion engine according to the present embodiment and which also includes an air intake system of a part of the internal combustion engine. An internal combustion engine 1 is a vehicle-driving diesel engine. However, the internal combustion engine according to the present invention is not limited to a diesel engine and may instead be a gasoline engine or the like.

An intake passage 15 and an exhaust passage 2 are connected to the internal combustion engine 1. The intake passage 15 is provided with an air flow meter 16 and a throttle valve 17. The air flow meter 16 detects an intake air amount of the internal combustion engine 1. The throttle valve 17 adjusts the intake air amount of the internal combustion engine 1.

In addition, the exhaust passage 2 is provided with an SCRF 4 which is formed by having a wall flow type filter that collects particulate matter (PM) in exhaust gas carry a selective redaction NOx catalyst (hereinafter, simply referred to as an "SCR filter") that selectively reduces NOx in the exhaust gas by using ammonia as a reducing agent. Furthermore, in order to generate ammonia that acts as a reducing agent at the SCR catalyst carried by the SCRF 4, urea water stored in a urea tank 8 as a precursor of ammonia is supplied into exhaust gas by a supply valve 7 positioned on an upstream side of the SCRF 4. Urea water supplied from the supply valve 7 is hydrolyzed by heat of the exhaust gas to generate ammonia. Upon reaching the SCRF 4, the ammonia is adsorbed by the SCR catalyst carried by the SCRF 4. Subsequently, a reduction reaction occurs between ammonia and NOx in the exhaust gas and purification of NOx is performed. While urea water is supplied from the supply valve 7 as described above in the present embodiment, alternatively, ammonia or ammonia water may be directly supplied to exhaust gas.

An oxidation catalyst (hereinafter, an "ASC catalyst") 5 for oxidizing ammonia that slips from, the SCRF 4 is provided on a downstream side of the SCRF 4. In addition, the ASC catalyst 5 may be a catalyst configured by combining an oxidation catalyst and an SCR catalyst that reduces NOx in exhaust gas by using ammonia as a reducing agent. In this case, for example, the oxidation catalyst may be formed by having a carrier made of a material such as aluminum oxide ($Al_2O_3$) or zeolite carry a precious metal such as platinum (Pt) and the SCR catalyst may be formed by having a carrier made of a material such as zeolite carry a base metal such as copper (Cu) or Iron (Fe). By adopting a catalyst configured as described above as the ASC catalyst 5, HC, CO, and ammonia in exhaust gas can be oxidized and, by oxidizing a part of the ammonia, NOx can be generated and the generated NOx can be reduced by excess ammonia.

Furthermore, an oxidation catalyst 3 having an oxidizing function is provided on an upstream side of the SCRF 4 and the supply valve 7. A fuel supply valve 6 capable of supplying fuel (a fuel component) of the internal combustion engine 1 to the oxidation catalyst 3 via exhaust gas flowing into the oxidation catalyst 3 is arranged on an upstream side of the oxidation catalyst 3. The fuel component supplied to exhaust gas from the fuel supply valve 6 is oxidized by the oxidation catalyst 3 and may raise the temperature of exhaust gas that flows into the SCRF 4 that is positioned downstream.

Moreover, a temperature sensor 9 that detects a temperature of exhaust gas flowing out from the oxidation catalyst 3 is provided on a downstream side of the oxidation catalyst 3, a NOx sensor 10 that detects NOx in exhaust gas flowing into the SCRF 4 is provided on an upstream side of the SCRF 4, and a NOx sensor 11 that detects NOx and a temperature sensor 12 that detects a temperature of exhaust gas flowing out from the SCRF 4 are provided on a downstream side of the SCRF 4. In addition, the internal combustion engine 1 is provided with an electronic control unit (ECU) 20. The ECU 20 is a unit that controls an operating state of the internal combustion engine 1, the exhaust gas purification system, and the like. The temperature sensors 9 and 12 and NOx sensors 10 and 11 described above as well as an air flow meter 16, a crank position sensor 21, and an accelerator depression amount sensor 22 are electrically connected to the ECU 20. Accordingly, detection values of the respective sensors are given to the ECU 20. Therefore, the ECU 20 is capable of determining an intake air amount based on a detection value of the air flow meter and an exhaust flow rate calculated based on the intake air amount, an engine rotational speed based on detection by the crank position sensor 21, and parameters related to an operating state of the internal combustion engine 1 such as an engine load based on detection by the accelerator depression amount sensor 22.

Moreover, while NOx in exhaust gas flowing into the SCRF 4 can be detected by the NOx sensor 10 in the present embodiment, since NOx included in exhaust gas discharged from the internal combustion engine 1 (which is exhaust gas prior to being purified by the SCRF 4 and which is the exhaust gas flowing into the SCRF 4) is related to an operating state of the internal combustion engine 1, the NOx in the exhaust gas flowing into the SCRF 4 can also be estimated based on the operating state of the internal combustion engine 1. In addition, the ECU 20 is also capable of estimating a temperature of the oxidation catalyst 3 based on an exhaust temperature detected by the temperature sensor 9 or a temperature sensor (not shown) provided on an upstream side of the oxidation catalyst 3 and estimating temperatures of the SCRF 4 and the ASC catalyst 5 based on an exhaust temperature detected by the temperature sensor 12 or a temperature sensor (not shown) provided on an upstream side of the SCRF 4.

Furthermore, in accordance with an NOx amount (NOx concentration) in exhaust gas that is detected and estimated as described above, the ECU 20 issues an instruction to the supply valve 7 and causes urea water to be supplied to exhaust gas in an amount necessary for reduction and purification of NOx. Specifically, urea water supply from the supply valve 7 is controlled so that a NOx purification rate by the SCRF 4 as determined according to Expression 1 below is within a prescribed range that is favorable from the perspective of exhaust gas purification.

NOx purification rate=1−(detection value of NOx sensor 11)/(detection value of NOx sensor 10)   (Expression 1)

Moreover, since NOx purification using supplied urea water cannot be effectively performed when the SCRF 4 is not in an active state, the urea water supply from the supply valve 7 is performed when the estimated temperature of the SCRF 4 is equal to or higher than a prescribed temperature at which the catalyst is in an active state.

In the exhaust gas purification system of the internal combustion engine 1 configured as described above, purification of NOx and removal of PM in exhaust gas are performed by the SCRF 4. In doing so, collected PM is gradually deposited at the SCRF 4, and operation of the internal combustion engine 1 may be hindered when the deposition amount of the collected PM exceeds a certain amount. Therefore, in such a case, a filter regenerating process for removing PM deposited at the SCRF 4 is executed by the ECU 20. In the filter regenerating process according to the present embodiment, a fuel component is supplied from the fuel supply valve 6, the fuel component is oxidized by the oxidation catalyst 3, and the oxidation heat causes the temperature of exhaust gas flowing into the SCRF 4 to rise. When executing the filter regenerating process, by controlling a supply amount of the fuel component from the fuel supply valve 6, the temperature of the SCRF 4 is increased to a prescribed filter regenerating temperature (for example, 600 to 650° C.) at which oxidation of PM is promoted. As a result, PM deposited at the SCRF 4 is oxidized and removed and PM collection performance of the SCRF 4 is regenerated.

In the present embodiment, execution of a filter regenerating process may be requested each time a prescribed amount of time lapses from the end of execution of a previous filter regenerating process or alternatively, execution of a filter regenerating process may be requested each time a vehicle mounted with the internal combustion engine 1 travels a prescribed travel distance. In addition, execution of a filter regenerating process may be requested each time the PM deposition amount at the SCRF 4 reaches a prescribed deposition amount. The PM deposition amount at the SCRF 4 can be estimated based on histories of a fuel injection amount of the internal combustion engine 1, a flow rate of exhaust gas flowing into the SCRF 4, a temperature of the SCRF 4, and the like. Subsequently, when execution of a filter regenerating process is requested, the filter regenerating process is executed (in other words, supply of the fuel component from the fuel supply valve 6 is executed) when the temperature of the oxidation catalyst 3 is equal to or higher than a prescribed active temperature. The prescribed active temperature is a temperature at which the fuel component supplied from, the fuel supply valve 6 can be oxidized to a certain degree by the oxidation catalyst 3. The prescribed active temperature is a temperature which is determined according to a type and a configuration of the oxidation catalyst 3 and has been determined in advance by an experiment or the like.

Figure 2:
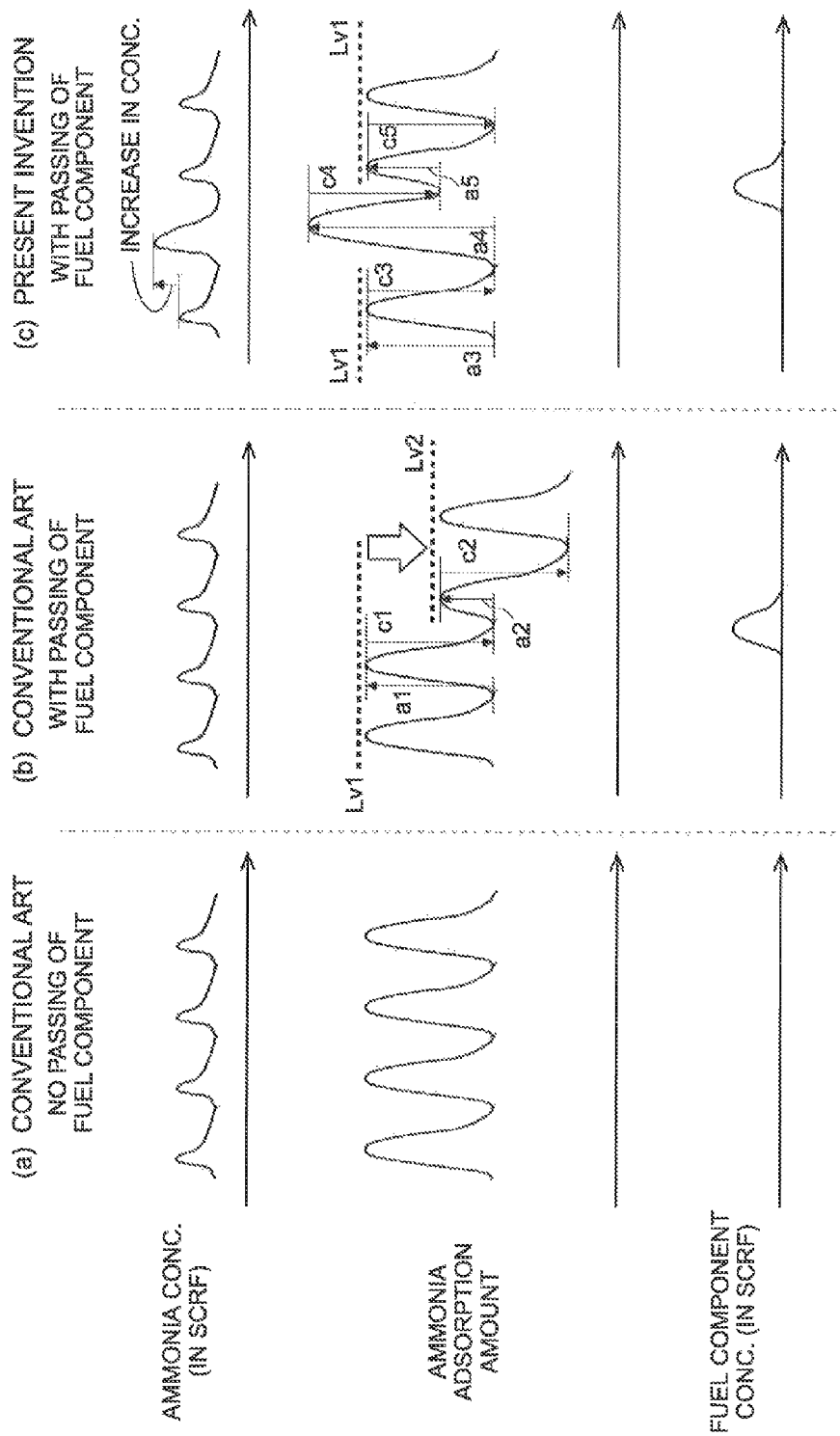
FIG. 2 is a diagram showing transitions of ammonia adsorption amounts when urea water supply for NOx purification is performed according to conventional art and the present invention.

While the fuel component supplied to exhaust gas from the fuel supply valve 6 is ideally oxidized by the oxidation catalyst 3 in order to raise exhaust temperature, in reality, there may be cases where the fuel component passes through the oxidation catalyst 3 instead of being used for an oxidation reaction at the oxidation catalyst 3 and flows into the SCRF 4 on the downstream side due to various factors such as a flow rate of exhaust gas flowing into the oxidation catalyst 3, an amount of the supplied fuel component, and a temperature of the oxidation catalyst 3. The phenomenon of passing by the fuel component and a transition in an adsorption amount of ammonia in the SCRF 4 when the fuel component passes will be described with reference to FIG. 2. FIG. 2 respectively shows a transition of ammonia concentration in the SCRF 4, a transition of an ammonia adsorption amount in the SCRF 4, and a transition of fuel component concentration in the SCRF 4 when urea water supply for NOx purification is performed in cases where; (a) NOx purification according to conventional art is performed and passing of the fuel component has not occurred; (b) NOx purification according to conventional art is performed and passing of the fuel component has occurred; and (c) NOx purification according to the present invention is performed and passing of the fuel component has occurred. Moreover, in the example shown in FIG. 2, urea water is periodically supplied from the supply valve 7 in accordance with NOx concentration in exhaust gas.

As is apparent from FIG. 2(a), in correspondence with urea water that is supplied periodically, the ammonia concentration in the SCRF 4 also increases or decreases periodically and the adsorption amount of ammonia by the SCRF 4 also increases or decreases periodically. This is because ammonia periodically reaching the SCRF 4 is adsorbed by the SCR catalyst that is carried by the SCRF 4 and produces a reducing action with respect to NOx in the exhaust gas and, as a result, the adsorbed ammonia is consumed. In this case, when the fuel component supplied from the fuel supply valve 6 passes through the oxidation catalyst 3 due to reasons such as a flow rate of exhaust gas flowing into the oxidation catalyst 3 being large, the passed fuel component reaches the SCRF 4 as shown in FIG. 2(b). A transition of the ammonia adsorption amount by the SCRF 4 when urea water supply according to conventional art is performed at this point is shown in FIG. 2(b).

Until the passed fuel component reaches the SCRF 4, an increase in the adsorption amount indicated by an arrow a1 and consumption of adsorbed ammonia indicated by an arrow c1 are repeated in accordance with the periodic supply of urea water in a similar manner to the case shown in FIG. 2(a). The ammonia adsorption amount by the SCRF 4 at this point is at a level denoted by Lv1 in FIG. 2(b). In this case, when the passed fuel component reaches the SCRF 4, the fuel component is adsorbed by a site (hereinafter, referred to as a "prescribed site") originally intended to adsorb ammonia of the SCR catalyst that is carried by the SCRF 4. Therefore, even if urea water supply from the supply valve 6 is performed, ammonia generated from the urea water cannot be efficiently adsorbed by the prescribed site of the SCR catalyst. As a result, an adsorption amount only increases as indicated by an arrow a2 in FIG. 2(b) or, in other words, an increase in the adsorption amount is limited to the that indicated by the arrow a2 which is less than the increase in the adsorption amount indicated by the arrow a1 due to the effect of the adsorbed fuel component. Subsequently, consumption of adsorbed ammonia indicated by an arrow c2 and an increase in the adsorption amount due to periodic urea water supply are once again repeated. As a result, in the case shown in FIG. 2(b), after the passed fuel component reaches the SCRF 4, the ammonia adsorption amount by the SCRF 4 drops to a level denoted by Lv2 that is lower than the level denoted by Lv1 described earlier. This means that the amount of ammonia that is adsorbed by the SCRF 4 in equilibrium decreases and may cause a decline in the NOx purification rate by the SCRF 4.

In consideration thereof, in NOx purification according to the present invention, urea water supply is controlled so that the amount of ammonia that is adsorbed by the SCRF 4 in equilibrium does not decrease as much as possible even when the passed fuel component reaches the SCRF 4. Details thereof will now be described with reference to FIG. 2(c). First, until the passed fuel component reaches the SCRF 4, an increase in the adsorption amount indicated by an arrow a3 and consumption of adsorbed ammonia indicated by am arrow c3 are repeated in accordance with the periodic supply of urea water in a similar manner to the cases shown in FIGS. 2(a) and 2(b). The ammonia adsorption amount by the SCRF 4 at this point is at a level denoted by Lv1 in FIG. 2(c). In this case, the amount of the periodically supplied urea water is increased immediately before the passed fuel component reaches the SCRF 4. Therefore, the ammonia concentration in the SCRF 4 at this time point is higher than a previous ammonia concentration and the ammonia adsorption amount by the SCRF 4 also increases by an amount indicated by an arrow a4. The increase in the adsorption amount indicated by the arrow a4 is greater than previous increases in the adsorption amount (for example, the increase in the adsorption amount indicated by the arrow a3). Therefore, albeit temporarily, the ammonia adsorption amount by the SCRF 4 exceeds the level denoted by Lv1 as shown in FIG. 2(c).

Furthermore, subsequently, the passed fuel component reaches the SCRF 4 in a state where ammonia adsorbed for the reduction and purification of NOx in exhaust gas has been consumed by an amount indicated by an arrow c4. In this manner, with the NOx purification control according to the present invention, before the passed fuel component reaches the SCRF 4, urea water is supplied in an amount increased as compared to a supply amount of urea water in a case where passing of the fuel component has not occurred or, in other words, an amount of urea water supply for realizing an increase in the adsorption amount corresponding to the arrow a3. Details of the increase amount of urea water will be described later. Moreover, in the present specification, ammonia generated from urea water supplied in the increased amount or, in other words, ammonia in an increased amount will be hereinafter referred to as "increased ammonia" (for example, ammonia indicated by the arrow a4), and other ammonia generated from urea water supplied without being increased will be hereinafter referred to as "ordinary ammonia" (for example, ammonia indicated by the arrow a3). Therefore, the increased ammonia is adsorbed at the prescribed site of the SCR catalyst and the fuel component is adsorbed at the prescribed site after this state. In this case, when the fuel component reaches the SCRF 4, catalyst. Therefore, even if urea water supply is subsequently performed from the supply valve 6, ammonia generated from the urea water cannot be efficiently adsorbed at the prescribed site of the SCR catalyst and, as a result, an adsorption amount only increases as indicated by an arrow a5 in FIG. 2(c) or, in other words, an increase in the adsorption amount is limited to that indicated by the arrow a5 which is less than the increase in the adsorption amount indicated by the arrow a3 due to the effect of the adsorbed fuel component in a similar manner to FIG. 2(b).

However, with the NOx according to the present invention, since the ammonia adsorption amount by the SCRF 4 is increased before the passed fuel component reaches the SCRF 4, even if the ammonia adsorption amount decreases due to the effect of the adsorbed fuel component as described above, the ammonia adsorption amount after the passed fuel component reaches the SCRF 4 can be maintained at a level (the level denoted by Lv1) that is similar to the level of ammonia adsorption amount before the passed fuel component reaches the SCRF 4, As a result, even when consumption of adsorbed ammonia indicated by an arrow c5 and an increase in the adsorption amount due to periodical urea water supply are repeated once again, the ammonia adsorption amount in equilibrium is to be maintained at approximately the level denoted by Lv1 and, as a result, a decline in the NOx purification rate of the SCRF 4 attributable to the passed fuel component can be avoided.

Figure 3:
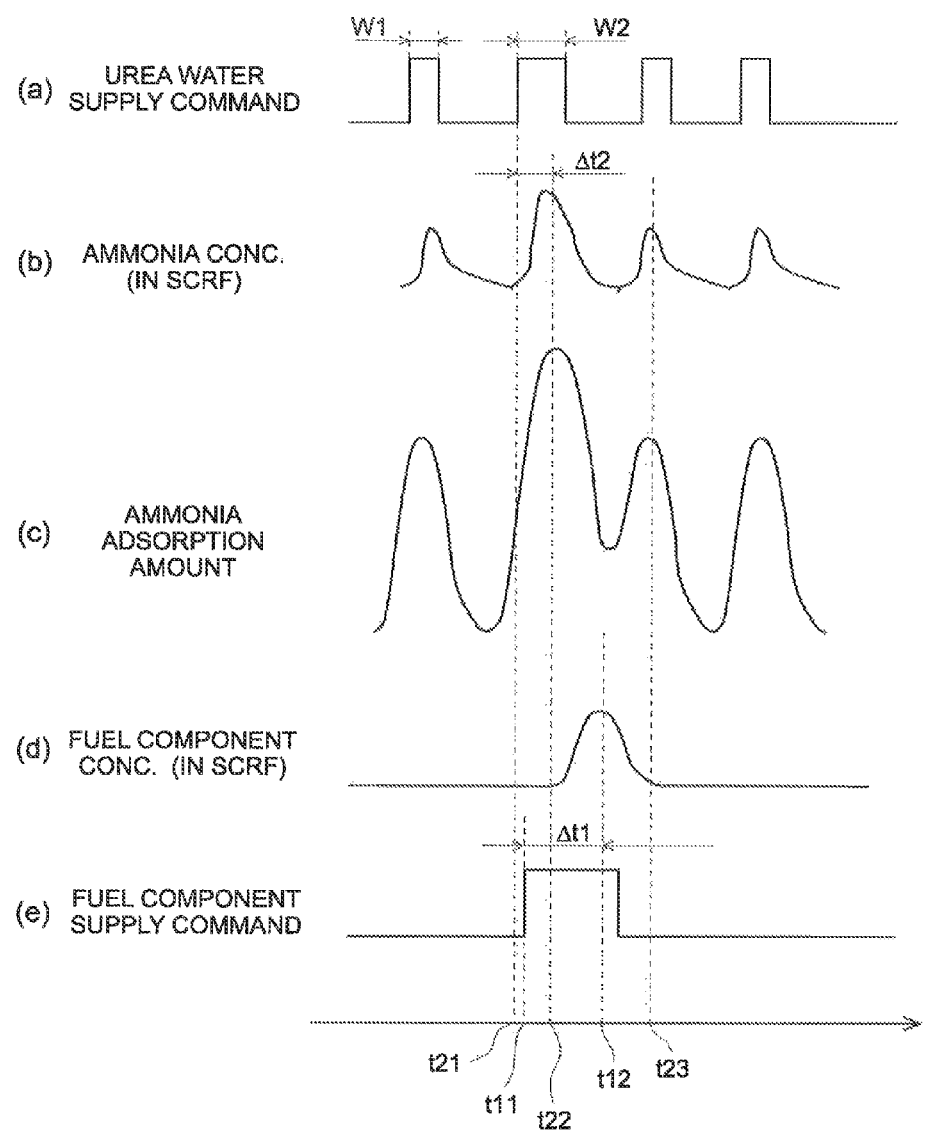
FIG. 3 is a diagram, for explaining respective supply timings of urea water supply and fuel component supply that are executed in the exhaust gas purification system of an internal combustion engine according to the present invention.

As described above, with the NOx purification according to the present invention, the effect of the passed fuel component can be reduced. Meanwhile, in order to demonstrate this effect in a favorable manner, the increased ammonia must reach the SCRF 4 before the passed fuel component reaches the SCRF 4 as described above. In consideration thereof, urea water supply that enables ammonia to be supplied to the SCRF 4 in this manner will be described with reference to FIG. 3. FIG. 3 is a diagram with aligned horizontal time axes which shows vertically side by side: (a)

a urea water supply command issued from the ECU 20 to the supply valve 7; (b) a transition of ammonia concentration in the SCRF 4; (c) a transition of an ammonia adsorption amount in the SCRF 4; (d) a transition of fuel component concentration in the SCRF 4; and (e) a fuel component supply command issued from the ECU 20 to the fuel supply valve 6. Moreover, contents of descriptions of (b), (c), and (d) in FIG. 3 are substantially the same as the content of the description shown in FIG. 2(c).

The vital point of NOx purification according to the present invention is that the increased ammonia reaches the SCRF 4 before the passed fuel component reaches the SCRF 4. Moreover, in FIG. 3, a reaching timing of the passed fuel component at the SCRF 4 is represented by t12 and a reaching timing of increased ammonia at the SCRF 4 is represented by t22. In addition, a reaching timing of ordinary ammonia that is to next reach the SCRF 4 after the increased ammonia as periodic supply of urea water is being performed is represented by t23.

Furthermore, in the present embodiment, a correlation between a supply timing of urea water from the supply valve 7 (in other words, a start timing of a supply command that is issued from the ECU 20 to the supply valve 7) and a supply timing of the fuel component from the fuel supply valve 6 (in other words, a start timing of a supply command that is issued from the ECU 20 to the fuel supply valve 6) is adjusted so that the reaching timing t12 of the passed fuel component occurs approximately midway between the reaching timing t22 of the increased ammonia and the reaching timing t23 of the ordinary ammonia. In addition, the adjustment takes into consideration a time (hereinafter, referred to as a "fuel component reaching time") $\Delta t1$ required by a part of the fuel component supplied from the fuel supply valve 6 to reach the SCRF 4 as a passed fuel component and a time (hereinafter, referred to as an "ammonia reaching time") $\Delta t2$ required by urea water supplied from the supply valve 7 to reach the SCRF 4 as ammonia.

For example, the fuel component reaching time $\Delta t1$ can be calculated according to Expression 2 below.

$\Delta t1$=(capacity from fuel supply valve 6 to SCRF 4)/((detection value of air flow meter 16+fuel injection amount per unit time)×gas density)   (Expression 2)

In addition, the ammonia reaching time $\Delta t2$ can be calculated according to Expression 3 below.

$\Delta t2$=(capacity from supply valve 6 to SCRF 4)/((detection value of air flow meter 16+fuel injection amount per unit time)×gas density)   (Expression 3)

In Expressions 2 and 3 provided above, ((detection value of air flow meter 16+fuel injection amount per unit time)× gas density) refers to an exhaust amount per unit time.

In addition, in order to have the passed fuel component reach the SCRF 4 at a timing t12 when it is assumed that the fuel component is to pass through, a supply command may be issued from the ECU 20 at a timing t11 that precedes the timing t12 by $\Delta t1$ to have the fuel component be supplied from the fuel supply valve 6. Furthermore, in order to have the increased ammonia reach the SCRF 4 at a timing t22, a supply command may be issued from the ECU 20 at a timing t21 that precedes the timing t22 by $\Delta t2$ to have urea water be supplied from the supply valve 7. Moreover, in FIG. 3, with respect to a urea water supply command (a command having a pulse width of W1) corresponding to ordinary ammonia, a urea water supply command (a command having a pulse width of W2) corresponding to increased ammonia has a relationship expressed as W2>W1 due to a larger supply amount of urea water. It should be noted that timings of supply commands and a correlation between reaching timings of a passed fuel component and ammonia at the SCRF 4 shown in FIG. 3 are simply examples and may fluctuate depending on various conditions such as a flow rate of exhaust gas flowing through the exhaust passage 2 and on conditions (supply amount, supply frequency, and the like) of urea water supply for NOx purification.

Figure 4:
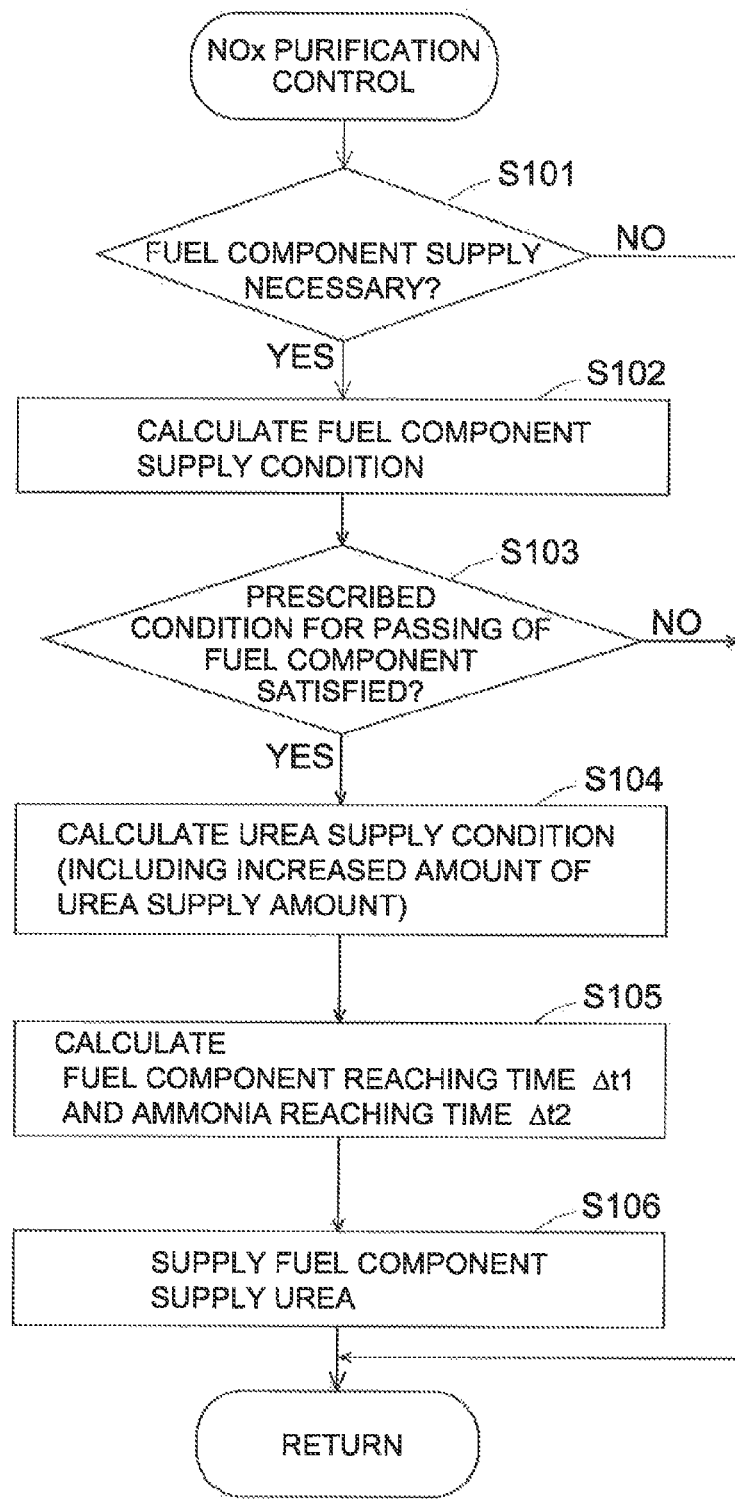
FIG. 4 is flow chart related to NOx purification control accompanied by urea water supply which is executed in the exhaust gas purification system of an internal combustion engine according to the present invention.

Next, control for performing NOx purification according to the present invention heretofore described will be described with reference to FIG. 4. The NOx purification control shown in FIG. 4 is performed as a control program stored in the ECU 20 is executed. First, in S101, a determination is made on whether or not supply of a fuel component from the fuel supply valve 6 is necessary. For example, the determination process of S101 may be performed by considering whether or not a timing has arrived for performing the filter regenerating process described earlier that is performed when the FM deposition amount at the SCRF 4 increases. In this case, when the filter regenerating process is to be performed, a determination that supply of the fuel component is necessary is made. In addition, even when exhaust temperature is intermittently raised in order to minimize clogging of the SCRF 4 although a relatively large amount of PM has not been deposited at the SCRF 4 as in a case where the filter regenerating process is to be performed, the determination process makes a determination that supply of the fuel component is necessary. When a positive determination is made in S101, the present control proceeds to S102. On the other hand, when a negative determination is made, the present control is ended.

Next, in S102, in consideration of the fact that fuel, supply has been determined to be necessary, a supply condition necessary for the fuel supply is calculated. For example, when supplying the fuel component for the filter regenerating process, a supply amount of the fuel component is calculated based on the amount of PM deposited on the SCRF 4. In addition, the number of injections (injection frequency) by the fuel supply valve 6 is adjusted in accordance with the calculated supply amount of the fuel component so that the fuel component injected from the fuel supply valve 6 is appropriately dispersed in exhaust gas. Once the process of S102 ends, the control proceeds to S103.

Figure 5A:
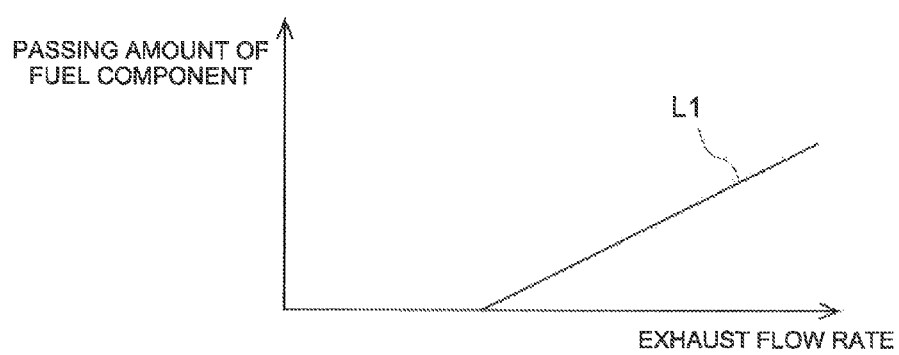
FIG. 5A is a diagram showing a correlation between a flow rate of exhaust gas that flows into an oxidation catalyst and an amount of a fuel component that passes through the oxidation catalyst.

In S103, a determination is made on whether or not a prescribed condition of passing is satisfied in which, when the fuel component to be supplied under the supply condition calculated in S102 is supplied, a part of the fuel component flows out to a downstream side as a passed fuel component without being oxidized by the oxidation catalyst 3. An oxidation reaction of the fuel component at the oxidation catalyst 5 tends to depend upon reaction opportunities between the fuel component and oxygen at the oxidation catalyst 3. In consideration thereof, for example, as shown in FIG. 5A, whether or not the prescribed condition is satisfied may be determined based on a correlation between a flow rate of exhaust gas flowing into the oxidation catalyst 3 and a passing amount of the fuel component. As indicated by line L1 in FIG. 5A, when the exhaust flow rate is relatively low, the passing amount can be ignored since opportunities of an oxidation reaction by the fuel component at the oxidation catalyst 3 are secured. However, as the exhaust flow rate increases over a threshold, the passing amount conceivably increases in accordance with the increase in the exhaust flow rate.

Figure 5B:
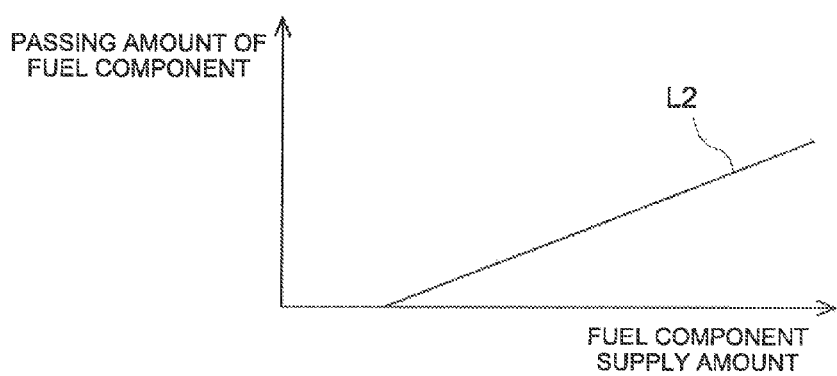
FIG. 5B is a diagram showing a correlation between an amount of a fuel component supplied into exhaust gas and an amount of a fuel component that passes through an oxidation catalyst.

In addition, the supply amount of the fuel component is also considered to be a parameter related to the reaction opportunities described above. Therefore, for example, as shown in FIG. 5B, whether or not the prescribed condition is satisfied may be determined based on a correlation between a supply amount of the fuel component and a passing amount of the fuel component. As indicated by line L2 in FIG. 5B, when the supply amount of the fuel component is relatively small, the passing amount can be ignored since opportunities of an oxidation reaction by the fuel component at the oxidation catalyst 3 are secured. However, as the supply amount of the fuel component increases over a threshold, the fuel component is not sufficiently used for the oxidation reaction and the passing amount conceivably increases in accordance with the increase in the supply amount of the fuel component. Moreover, when making the determination of whether or not the prescribed condition is satisfied, the exhaust flow rate and the supply amount of the fuel component described above may be comprehensively considered or either one may be considered. Furthermore, since the temperature of the oxidation catalyst 3 is also considered to be a parameter that may affect oxidation efficiency of the fuel component, the determination of whether or not the prescribed condition is satisfied may be made by also taking the temperature of the oxidation catalyst 3 into consideration. When a positive determination is made in S103, the present control proceeds to S104. On the other hand, when a negative determination is made, the present control is ended.

Figure 6:
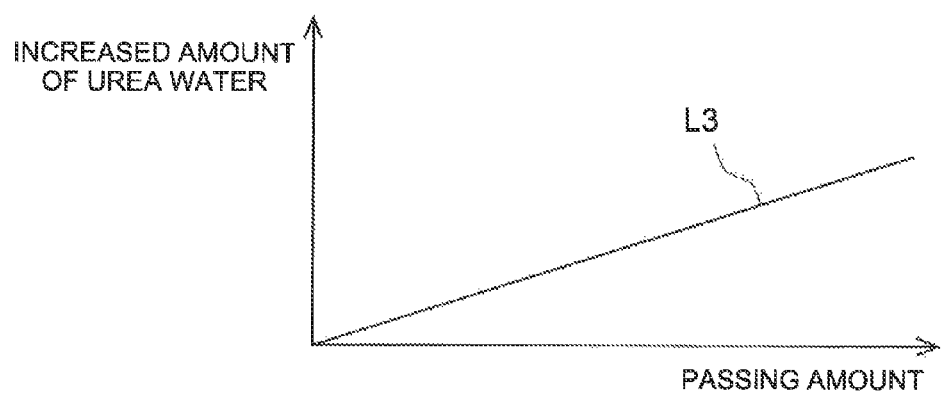
FIG. 6 is a diagram showing a correlation between an amount of a fuel component that passes through an oxidation catalyst and an increased amount of urea water that is calculated in the NOx control shown in FIG. 4 which is used to calculate the increased amount.

In S104, a supply condition of urea water by the supply valve 7 is calculated. For example, a urea water amount for supplying ammonia necessary for reduction and purification of NOx is calculated so that a NOx purification rate calculated according to Expression 1 from the NOx sensors 10 and 11 is within a prescribed purification rate range. In doing so, an increased amount of urea water necessary for generating the increased ammonia, described with reference to FIGS. 2 and 3 is also calculated. Specifically, in consideration of the fact that the increased ammonia is for reducing the effect of the fuel component passing through the oxidation catalyst 3 as described above, an increased amount of urea water is calculated based on the passing amount of the fuel component used when performing the determination process of S103. More specifically, as shown in FIG. 6, the increased amount of urea water is increased as the passing amount of the fuel component increases. Furthermore, in addition to the supply amount of urea water, a frequency at which urea water is supplied to exhaust gas or, in other words, an interval between one urea water supply and a next urea water supply is also adjusted. Once the process of S104 ends, the control proceeds to S105.

Next, in S105, the fuel component reaching time $\Delta t1$ and the ammonia reaching time $\Delta t2$ are calculated according to Expressions 2 and 3. Subsequently, in S106, based on the supply condition of the fuel component and the supply condition of urea water calculated in S102 and S104 and the respective reaching times $\Delta t1$ and $\Delta t2$ calculated in S105, timings of a urea water supply command and a fuel component supply command are adjusted so that a correlation between a supply timing of the fuel component and a supply timing of urea water is as shown in FIG. 3 or, in other words, so that the passed fuel component reaches the SCRF 4 at a timing between reaching timings of increased ammonia and next ordinary ammonia, (for example, approximately midway between both reaching timings at the SCRF 4). When timings of a urea water supply command and a fuel component supply command are adjusted in this manner, a margin of adjustment may be limited according to an operating state of the internal combustion engine. For example, when a rapid increase in PM collected by the SCRF 4 necessitates a filter regenerating process to be promptly performed, after setting a timing of a fuel component supply command to an optimal timing for the filter regenerating process, a timing of a urea water supply command may be determined so that increased ammonia reaches the SCRF 4 before a passed fuel component that is created by the filter regenerating process. Conversely, when a timing of a urea water supply command must be set to a particular timing due to prescribed reasons, a timing of a fuel component supply command may be determined so that the passed fuel component does not reach the SCRF 4 before increased ammonia that is to reach the SCRF 4 due to the urea water supply command. When the process of S106 ends, the present control is repeated once again.

As described above, according to the present control, even when the passed fuel component reaches the SCRF 4, increased ammonia can be adsorbed by the SCR catalyst carried by the SCRF 4 before the passed fuel component and, as a result, an effect of the passed fuel component on an ammonia adsorption amount by the SCR catalyst can be minimized.

<First Modification>

While urea water supply and reaching of the SCRF 4 by a passed fuel component in correspondence to increased ammonia respectively occur only once (refer to FIG. 3) in the embodiment described above, when an amount of the passed fuel component reaching the SCRF 4 is large, urea water supply corresponding to increased ammonia can be consecutively performed for a plurality of times. In addition, when supply of a fuel component is performed a plurality of times in accordance with a PM amount that must be oxidized and removed in a filter regenerating process and when it is determined that passing of the fuel component is to occur in correspondence to each supply, a timing of each urea water supply and a timing of each fuel component supply may be determined based on technical ideas of the present invention as described in the embodiment above so that increased ammonia and a passed fuel component alternately reach the SCRF 4.

<Second Modification>

In the exhaust gas purification system of an internal combustion engine shown in FIG. 1, the SCRF 4 is arranged in the exhaust passage 2 and a filter that collects PM and an SCR catalyst for NOx purification are integrally formed in the SCRF 4. In place of such a mode of the SCRF 4, the filter and the SCR catalyst may be individually arranged to respectively perform PM collection and NOx purification. In this case, the filter is arranged in an exhaust passage between the oxidation catalyst 3 and the supply valve 7 and the SCR catalyst is arranged on a downstream side of the supply valve 7. Even with modes according to such modifications, by performing the NOx purification control described above, the effect of a passed fuel component can be minimized and preferable NOx purification can be realized.

EXPLANATION OF REFERENCE NUMERALS AND CHARACTERS 1 internal combustion engine
2 exhaust passage
3 oxidation catalyst
4 selective reduction-type NOx catalyst (SCR catalyst)
5 ASC catalyst
6 fuel supply valve
7 supply valve
9, 12 temperature sensor
10, 11 NOx sensor
20 ECU 21 crank position sensor
22 accelerator depression amount sensor

The invention claimed is:

1. An exhaust gas purification system of an internal combustion engine, comprising:
an oxidation catalyst that is provided in an exhaust passage of the internal combustion engine and has an oxidizing function;
a fuel supplying unit that supplies a fuel component to the oxidation catalyst via exhaust gas flowing into the oxidation catalyst;
an exhaust gas purifying unit that is provided in the exhaust passage on a downstream side of the oxidation catalyst and is formed so as to include a filter which collects particulate matter in the exhaust gas, and a selective reduction-type NOx catalyst which selectively reduces NOx in the exhaust gas using ammonia as a reducing agent;
a reducing agent supplying unit that supplies ammonia or an ammonia precursor to the exhaust gas purifying unit via exhaust gas flowing into the exhaust gas purifying unit; and
an electronic control unit including a control program stored in the electronic control unit, such that upon execution of the control program by the electronic control unit, the electronic control unit is configured such that when a prescribed condition under which a part of the fuel component supplied by the fuel supplying unit passes through to the downstream side of the oxidation catalyst is satisfied, the electronic control unit controls the supply amount of ammonia or the ammonia precursor to be increased as compared to a non-passing time supply amount that is a supply amount of ammonia or the ammonia precursor to be supplied by the reducing agent supplying unit when the prescribed condition is not satisfied, and the electronic control unit is configured to control at least one of supply of the fuel component to be supplied by the fuel supplying unit and supply of the increased ammonia or ammonia precursor such that ammonia for NOx selective reduction by the increased ammonia or ammonia precursor reaches the exhaust gas purifying unit before the fuel component.

2. The exhaust gas purification system according to claim 1, wherein
the exhaust gas purifying unit is a NOx purification filter formed by the filter integrally formed with and carrying the selective reduction-type NOx catalyst.

3. The exhaust gas purification system according to claim 1, wherein
the electronic control unit is further configured to control at least one of a supply timing by the reducing agent supplying unit and a supply timing by the fuel supplying unit based on a time required by the fuel component supplied by the fuel supplying unit to reach the exhaust gas purifying unit, and a time required by ammonia for NOx selective reduction by ammonia or the ammonia precursor supplied by the reducing agent supplying unit to reach the exhaust gas purifying unit.

4. The exhaust gas purification system according to claim 3, wherein
supply of ammonia or the ammonia precursor by the reducing agent supplying unit is performed periodically according to an operating state of the internal combustion engine, and
the electronic control unit is further configured to control at least one of the supply timing by the reducing agent supplying unit and the supply timing by the fuel supplying unit so that the fuel component supplied by the fuel supplying unit reaches the exhaust gas purifying unit at a prescribed timing between a first reaching timing at which ammonia for NOx selective reduction by the increased ammonia or ammonia precursor that is supplied by the reducing agent supplying unit at one supply timing reaches the exhaust gas purifying unit, and a second reaching timing at which ammonia for NOx selective reduction by ammonia or the ammonia precursor that is supplied by the reducing agent supplying unit reaches the exhaust gas purifying unit next after the first reaching timing.

5. The exhaust gas purification system according to claim 3, wherein
supply of ammonia or the ammonia precursor by the reducing agent supplying unit is performed periodically according to an operating state of the internal combustion engine,
supply of the fuel component by the fuel supplying unit is performed a plurality of times, and
the electronic control unit is further configured to control at least one of the supply timing by the reducing agent supplying unit and the supply timing by the fuel supplying unit so that, in a period during which supply by the reducing agent supplying unit and supply by the fuel supplying unit are performed in an overlapping manner, the increased amount of ammonia or ammonia precursor is supplied by the reducing agent supplying unit, and ammonia for NOx selective reduction by ammonia or the ammonia precursor that is supplied by the reducing agent supplying unit and the fuel component supplied by the fuel supplying unit alternately reach the exhaust gas purifying unit.

6. The exhaust gas purification system according to claim 1, wherein the electronic control unit is configured to calculate a passed amount in which the fuel component supplied by the fuel supplying unit passes through to the downstream side of the oxidation catalyst when the prescribed condition is satisfied, based on at least any of an exhaust flow rate related to an operating state of the internal combustion engine, an amount of the fuel component supplied to exhaust gas, and a temperature of the oxidation catalyst related to an oxidation reaction of the oxidation catalyst, wherein
the electronic control unit is configured to determine an increased supply amount of ammonia or the ammonia precursor with respect to the non-passing time supply amount, based on the calculated passed amount of the fuel component.

* * * * *